United States Patent
Hu

(10) Patent No.: US 8,463,954 B2
(45) Date of Patent: *Jun. 11, 2013

(54) HIGH SPEED MEMORY ACCESS IN AN EMBEDDED SYSTEM

(75) Inventor: Chunfeng Hu, Singapore (SG)

(73) Assignee: Lantiq Deutschland GmbH, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/372,517

(22) Filed: Feb. 14, 2012

(65) Prior Publication Data

US 2012/0151103 A1    Jun. 14, 2012

Related U.S. Application Data

(63) Continuation of application No. 12/051,275, filed on Mar. 19, 2008, now Pat. No. 8,095,702.

(51) Int. Cl.
*G06F 13/28* (2006.01)
*G06F 3/00* (2006.01)
*G06F 5/00* (2006.01)
*G06F 13/36* (2006.01)

(52) U.S. Cl.
USPC ............... 710/22; 710/52; 710/308; 711/118

(58) Field of Classification Search
None
See application file for complete search history.

(56) References Cited

U.S. PATENT DOCUMENTS

| 6,393,521 | B1 * | 5/2002 | Fujii | 711/119 |
|---|---|---|---|---|
| 8,095,702 | B2 * | 1/2012 | Hu | 710/33 |
| 2005/0172049 | A1 * | 8/2005 | Kamei et al. | 710/22 |
| 2007/0073920 | A1 * | 3/2007 | Wu et al. | 710/22 |
| 2009/0043972 | A1 * | 2/2009 | Kamiko et al. | 711/154 |
| 2012/0084528 | A1 * | 4/2012 | Hu | 711/165 |

* cited by examiner

*Primary Examiner* — Kris Rhu
(74) *Attorney, Agent, or Firm* — Murphy, Bilak & Homiller, PLLC

(57) ABSTRACT

Data is processed in an embedded system by writing data read from a peripheral device in response to an event to memory external to the embedded system. The data or a portion of the data is copied to memory internal to the embedded system. Which portion of the data is stored in both the external memory and the internal memory is tracked. The copied data is retrieved from the internal memory by a processor included in the embedded system. The processor has one or more caches logically and physically separated from the internal memory. The processor uses the copied data it retrieved to begin servicing the event.

40 Claims, 4 Drawing Sheets

HIGH SPEED MEMORY ACCESS IN AN EMBEDDED SYSTEM

PRIORITY CLAIM

This application is a Continuation of U.S. application Ser. No. 12/051,275 filed on 19 Mar. 2008.

BACKGROUND OF THE INVENTION

Embedded systems are special-purpose computer systems designed to perform one or more dedicated functions. Some types of embedded system include cell phones, calculators, GPS (global positioning system) receivers, printers, network devices, digital cameras, traffic light controllers, etc. Embedded systems have one or more processors for controlling system operation. The embedded processor typically has one or more levels of cache for locally storing data and instructions. Locally caching data and instructions enables the embedded processor to quickly access information, thus avoiding the delay associated with reading the data and instructions from main memory external to the embedded system. However, data and instructions needed by an embedded processor are not always stored in a local cache due to their limited capacity. Also, there may be no cache coherency between peripherals and the processor in some systems, so the processor must invalidate the cache before processing newly received data. In either case, the processor must wait until the desired information is loaded from external system memory to the high speed cache. Many processor cycles are consumed while the desired information is read from the external main memory and stored in a high-speed local cache, reducing processor performance.

Embedded systems also typically include one or more peripheral devices such as Input/Output (I/O) devices like Ethernet controllers, USB controllers, UART (universal asynchronous receiver/transmitter) controllers, etc. An embedded peripheral device collects data from its I/O interface and passes the data to a DMA (direct memory access) controller. The DMA controller typically writes the data to the main memory located outside the embedded system and notifies the processor of the new data, e.g., via an interrupt signal. The embedded processor in turn reads the new data and processes it. However, the processor must wait several cycles while the data is read from the external memory over a slow memory interface. The data is eventually stored in a fast local cache accessible to the embedded processor, but the processor must wait for the data to be read from the external memory before processing the data.

SUMMARY OF THE INVENTION

According to the methods and apparatus taught herein, data is processed in an embedded system by writing data read from a peripheral device in response to an event to main memory external to the embedded system. The data or a portion of the data is copied to memory internal to the embedded system. Which portion of the data is stored in both the external memory and the internal memory is tracked. The copied data is retrieved from the internal memory by a processor included in the embedded system. The processor has one or more caches logically and physically separated from the internal memory. The processor uses the copied data it retrieved to begin servicing the event.

Of course, the present invention is not limited to the above features and advantages. Those skilled in the art will recognize additional features and advantages upon reading the following detailed description, and upon viewing the accompanying drawings.

DETAILED DESCRIPTION OF THE INVENTION

Figure 1:
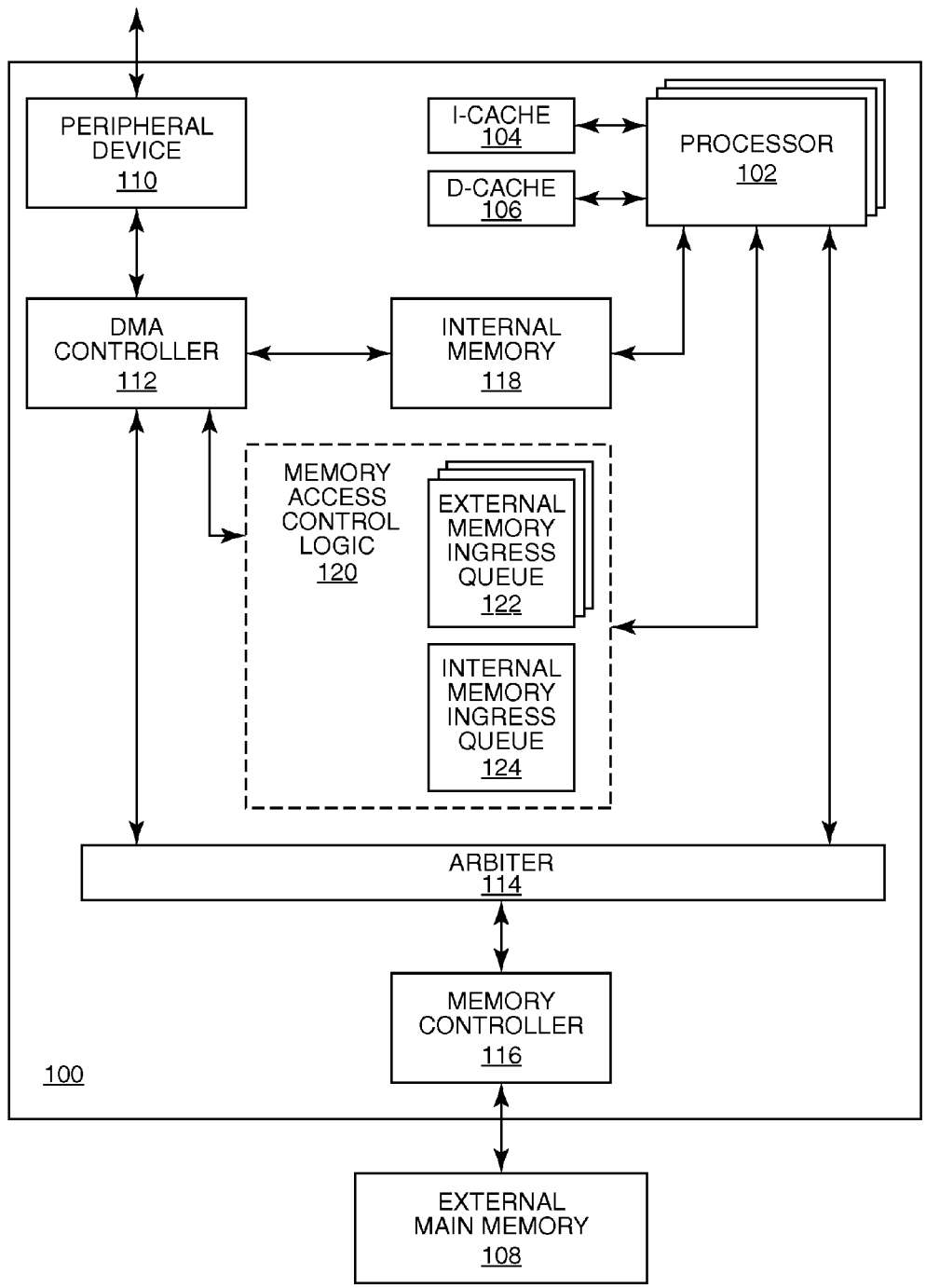
FIG. 1 is a block diagram of an embodiment of an embedded system including peripheral devices, a processor and fast internal memory.

FIG. 1 illustrates an embodiment of an embedded system 100. The embedded system 100 can perform any desired function or functions. The embedded system 100 includes at least one processor 102 having an instruction cache 104 and a data cache 106. The processor 102 periodically accesses main memory 108 external to the embedded system 100 such as one or more DRAM (dynamic random access memory) devices, hard drives, tape drives, etc. to load information from the external memory 108 into the caches 104, 106. This way, the processor 102 can more quickly process the information by accessing the local caches 104, 106 instead of frequently accessing the slower external memory 108. The processor 102 may have additional, higher-level caches such as level-2 or level-3 caches (not shown) for locally storing greater amounts of information. Moreover, the processor 102 may be a single-core processor or a multi-core processor.

The embedded system 100 further includes one or more peripheral devices 110. Each peripheral device 110 has an I/O interface over which data is externally transferred to and from the peripheral devices 110. A DMA controller 112 included in the embedded system 100 manages the flow of data between the peripheral devices 110 and the external main memory 108. The DMA controller 112 requests access to the external main memory 108 directly from the processor 102 or from an optional arbiter 114. The optional arbiter 114 can employ a round-robin, fixed priority or any other arbitration approach for assigning access priorities to the external memory 108. A memory controller 116 manages the overall flow of data between the embedded system 100 and the external main memory 108.

Figure 2:
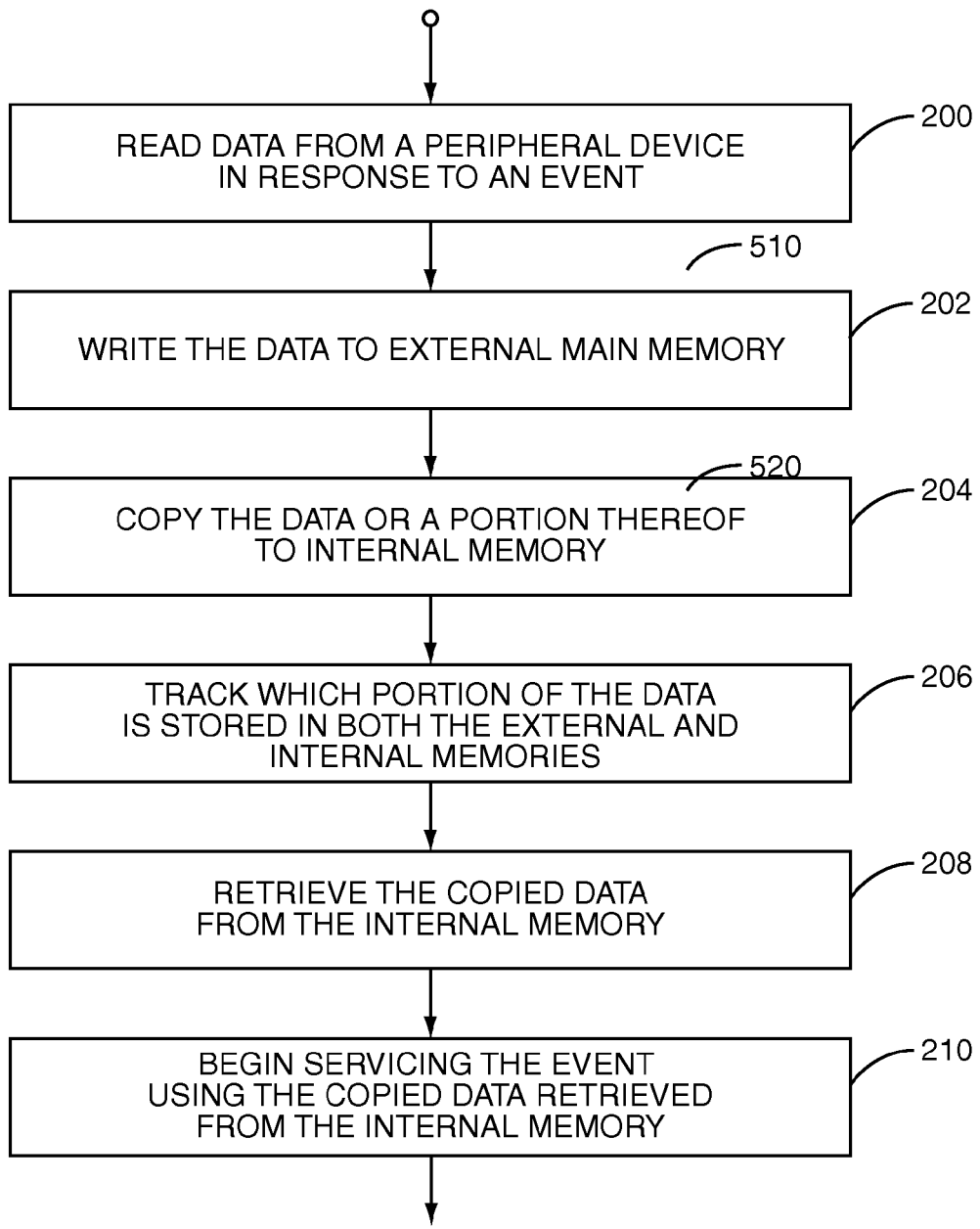
FIG. 2 is a logic flow diagram of an embodiment of processing logic for processing data in an embedded system.

Data is read from the peripheral device 110 by the DMA controller 112 in response to an event indicating new peripheral data is available such as an incoming data-available signal received from a UART peripheral device, a token packet received from a USB peripheral device or any other type of event, e.g., as illustrated by Step 200 of FIG. 2. The DMA controller 112 ensures that data read from the peripheral devices 110 is written to the external main memory 108, e.g., as illustrated by Step 202 of FIG. 2. The data or a portion thereof is also copied to fast internal memory 118 included in the embedded system 100 when free space is available, e.g., as illustrated by Step 204 of FIG. 2. The fast internal memory 118 is not a processor cache. Instead, the internal memory 118 is logically and physically separated from the processor caches 104, 106 and from the external system memory 108 and stores a full or partial copy of data read from the peripheral devices 110. This way, the processor 102 can begin to quickly service peripheral device events by first accessing the internal memory 118 instead of the slower external memory 108.

In one embodiment, all data read from the peripheral devices 110 is stored in both the external and internal memories 108, 118. In another embodiment, only a portion of the data is stored in the internal memory 118 such as packet header information included with packet data read from one or more of the peripheral devices 110. In yet another embodiment, whole packet data is stored first in the external memory 108, and when free space is available in the internal memory 118, the whole packet or a portion thereof is copied to the internal memory 118. Thus, data copied to the internal memory 118 may include partial packet data such as packet header information, entire packets or some combination of both. The packet header information may be layer 2, 3 or 4 packet headers. Regardless, at least some of the data read from the peripheral devices 110 is locally stored in the fast internal memory 118 when space is available so that the processor 102 does not have to access the slower external memory 108 to begin servicing peripheral device events. Instead, data retrieved from the internal memory 118 can be quickly loaded into the processor data cache 106 directly from the internal memory 118 and made available to the processor 102 or the processor 102 can access the data directly from the internal memory 118. According to one embodiment, the processor accesses the internal memory 118 when reading data, but not when writing data. Instead, the processor 102 writes modified data directly to the external main memory 108 and not to the internal memory 118.

In more detail, the embedded system 100 includes memory access control logic 120 that controls how the internal memory 118 is accessed and maintained. One or more external memory ingress queues 122 are allocated to each peripheral device 110 included in the embedded system 100. In one embodiment, more than one external memory ingress queue 122 is allocated to each peripheral device 110 so that traffic from the same peripheral device 100 can be prioritized. In either embodiment, the external memory ingress queues 122 indicate where data read from the peripheral devices 110 is stored in the external main memory 108. Thus, each time data is read from one of the peripheral devices 110 by the DMA controller 112, the memory access control logic 120 updates the corresponding external memory ingress queue 122 to indicate the location of the data in the external main memory 108. An additional ingress queue 124 is similarly allocated to the internal memory 118. The internal memory ingress queue 124 indicates which portion of data read from the peripheral devices 110 is stored in the internal memory 118. The memory access control logic 120 uses the external and internal memory ingress queues 122, 124 to track which portion of the peripheral data is stored in both the external and internal memories 108, 118, thus maintaining data coherency, e.g., as illustrated by Step 206 of FIG. 2.

The memory access control logic 120 can be implemented in hardware such as a state machine, software executed by the processor 102 or a combination of both. In one embodiment, the portion of the control logic 120 that controls the external memory ingress queues 122 is included in or associated with the DMA controller 112 when the DMA controller 112 manages the flow of data between the peripheral devices 110 and external main memory 108. Also according to this embodiment, the portion of the control logic 120 that controls the internal memory ingress queue 124 is included in or associated with the processor 102 when the processor 102 controls the flow of data between the internal memory 118 and the processor 102. Alternatively, both the DMA controller 112 and the control logic 120 can be integrated on the same silicon substrate (not shown) with the processor 102, e.g., as a system-on-chip arrangement. Other components included in the embedded system 108 such as the internal memory 118 (e.g., as embedded DRAM) and the peripheral devices 110 can also be integrated on the same substrate.

The processor 102 accesses the internal memory 118 to begin servicing a peripheral device event. The data previously copied to the internal memory 118 and associated with the event is retrieved by the processor 102, e.g., as illustrated by Steps 208 and 210 of FIG. 2. In one embodiment, data is written to and retrieved from the internal memory 118 based on a first-in, first-out queuing order. However, other queueing orders may be employed. Moreover, the optional arbiter 114 can use a round-robin, fixed priority or other scheme for deciding whether the DMA controller 112 or processor 102 gains access to the internal memory 118 if the internal memory 118 is a single-port memory. Alternatively, the internal memory 118 can be implemented as a double-port memory. Either way, the internal memory ingress queue 124 indicates to the processor 102 which region of the internal memory 118 contains the copied data associated with the peripheral event being serviced by the processor 102. The internal memory ingress queue 124 is then updated to reflect that the processor 102 has retrieved the data. The internal memory ingress queue 124 is similarly updated when new peripheral data is copied to the internal memory 118. The external memory ingress queues 122 are also updated when the DMA controller 112 writes new peripheral data to the external main memory 108 and copies at least a portion of the data to the internal memory 118. This way, coherency is maintained between the external and internal memories 108, 118 via the ingress queues 122, 124.

In one embodiment, the DMA controller 112 writes peripheral data to the external memory 108 and copies at least a portion of the data to the internal memory 118 in parallel. This way, the external memory 108 need not be subsequently accessed to copy the desired data to the internal memory 118. In another embodiment, the DMA controller 112 subsequently re-accesses the external memory 108 and copies the desired data to the internal memory 118. Thus, at least some of the peripheral data is available for use by the processor 102 in the fast, local internal memory 118. Moreover, the memory access control logic 120 maintains the external and internal memory ingress queues 122, 124 so that the processor 102 operates on coherent data regardless of which memory 108, 118 is accessed by the processor 102.

Figure 3:
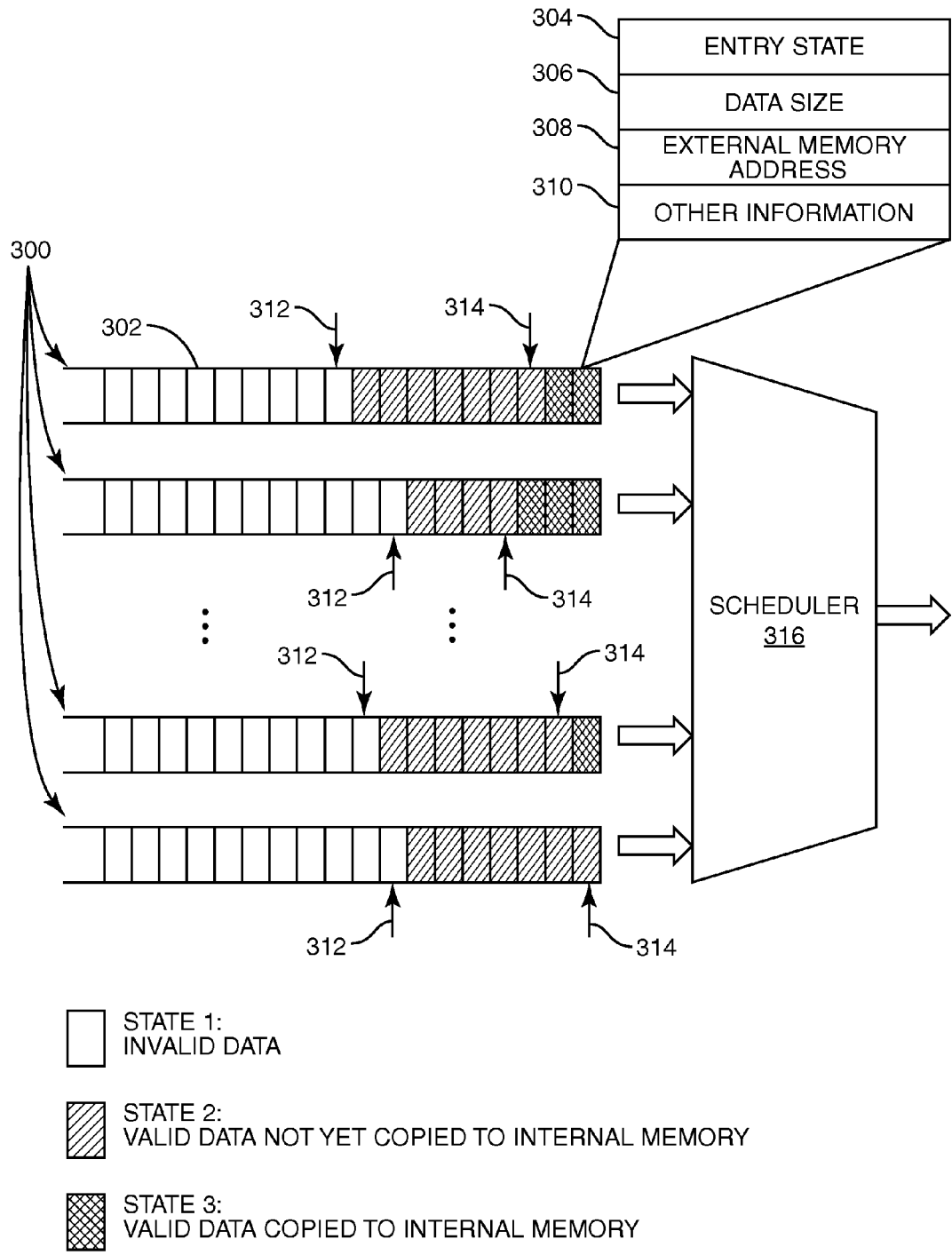
FIG. 3 is a block diagram of an embodiment of external memory ingress queues managed by a DMA controller included in an embedded system.

FIG. 3 illustrates an embodiment of the external memory ingress queues 122. One or more external memory ingress queues 300 are allocated to each peripheral device 110 included in the embedded system 100 as previously explained. Each ingress queue 300 has a plurality of entries 302 for storing data read from the corresponding peripheral device 110. Each entry 302 in turn has several fields 304-310 used to maintain data coherency. The first field 304 indicates whether the corresponding entry 302 contains valid or invalid data, and if valid, whether the data or a portion thereof has been copied to the internal memory 118. When peripheral data is newly written to one of the queue entries 302, the first field 304 of the entry 302 is updated to reflect that the entry 302 now contains valid data (e.g., state 2 in FIG. 3). After the data has been processed by the processor 102, the first field 304 is changed to indicate the entry 302 contains invalid data and is again available to store new data (e.g., state 1 in FIG. 3). The first field 304 also indicates when at least a portion of the data has been copied to the internal memory 118 (e.g., state 3 in FIG. 3). The second field 306 identifies the size of the data stored in the entry 302. In one embodiment, the number of packet bytes is indicated by the second field 306. The third field 308 identifies an address of the external main memory 108 where the data is stored. Each entry 302 in the external memory ingress queues 300 may have one or more additional fields 310 for storing other types of information related to data read from the peripheral devices 110.

In addition to maintaining the entry fields 304-310, the memory access control logic 120 also maintains several pointers 312, 314 for tracking ingress queue activity and maintaining data coherency. A first pointer 312 identifies the first entry 302 of each external memory ingress queue 300 that contains invalid data when the portion of external memory 108 allocated to the corresponding device 110 is not yet full. The first pointer 312 points to an entry 302 containing valid data when the memory location is full. This queue entry is known to the control logic 120 by examining the first field 304 of the entries 302. This way, data newly read from the peripheral devices 110 can be efficiently stored in the next available ingress queue entry 302. The first field 304 of the entry 302 is then changed to indicate the entry 302 now contains valid data. The first pointer 312 is also moved to identify the next entry 302 in the ingress queue 300 having invalid data.

A second pointer 314 identifies the first entry 302 of each external memory ingress queue 300 that contains valid data yet to be copied to the internal memory 118. This queue entry is again known to the control logic 120 by examining the first field 304 of the entries 302. A scheduler 316 included in or associated with the control logic 120 determines the order in which data is copied from the external memory ingress queues 300 to the internal memory 118. In one embodiment, the scheduler 316 accesses the queues 300 based on a particular queue priority. In another embodiment, the queues 316 are accessed based on a round-robin approach. When space becomes available in the internal memory 118, data (or a portion thereof) stored in the next regularly scheduled queue entry 302 is copied to the internal memory 118. The first field 304 of the entry 302 is then updated to reflect at least a portion of the data has been copied to the internal memory 118. The logic 120 moves the second pointer 314 to the next queue entry 302 containing valid data yet to be copied to the internal memory 118. The logic 120 correspondingly updates the internal memory ingress queue 124 when new data is written to the internal memory 118.

Figure 4:
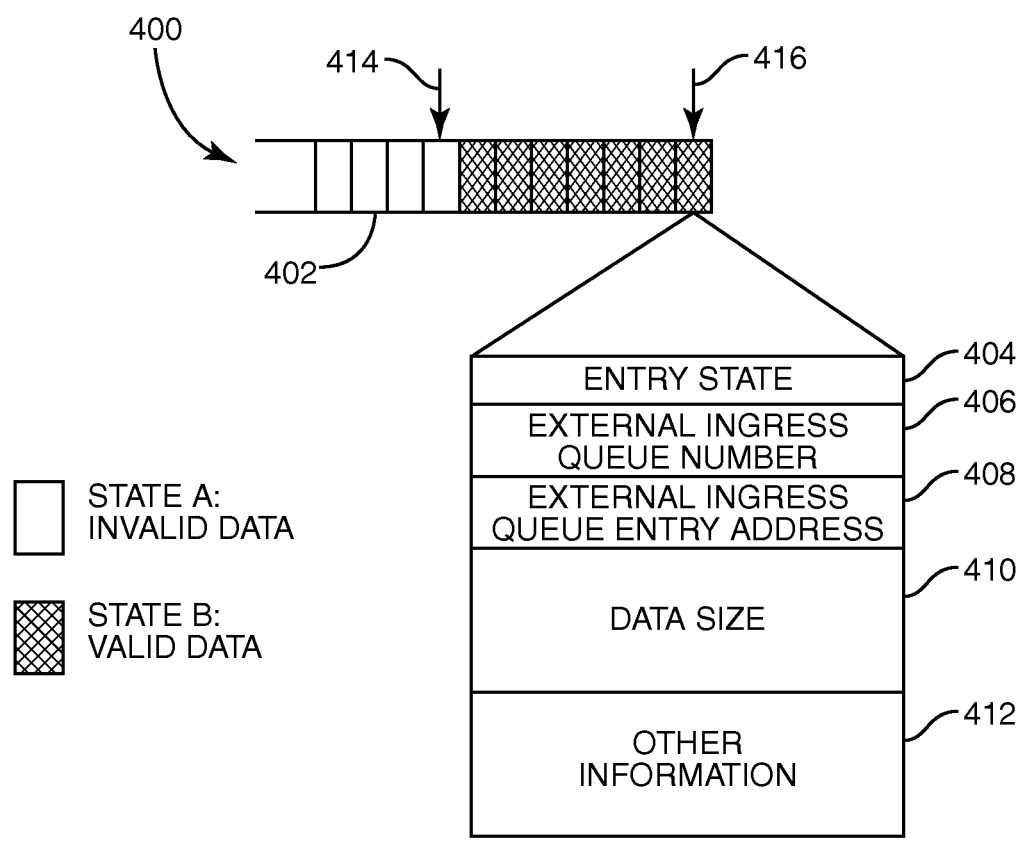
FIG. 4 is a block diagram of an embodiment of an internal memory ingress queue managed by a processor included in an embedded system.

FIG. 4 illustrates an embodiment of the internal memory ingress queue 124. An internal memory ingress queue 400 has a plurality of entries 402 for storing peripheral data copied to the internal memory 118. Each entry 402 has several fields 404-412 used to maintain data coherency. The first field 402 indicates whether the corresponding entry 402 contains valid or invalid copied data. When peripheral data is copied to the internal memory 118, the first field 404 of the entry 402 is updated to reflect that the entry 402 now contains valid data (e.g., state B in FIG. 4). In one embodiment, the amount of data copied to the internal memory 118 is indicated by a configuration parameter provided to the embedded system 100. After the copied data has been retrieved and processed by the processor 102, the first field 404 is changed back to invalid for indicating the entry 402 can once again be used for storing newly copied data (e.g., state A in FIG. 4). The second field 406 identifies which external memory ingress queue 300 peripheral data was copied from. For example, if data read from the first peripheral device 110 is copied from the first external memory ingress queue 300 to one of the entries 402 in the internal memory 118, the second field 406 of the entry 402 would indicate that the data was copied from the first external memory ingress queue 300. The second field 406 can be excluded if the embedded system 100 includes a single peripheral device 110. The third field 408 identifies the entry 302 of the external memory ingress queue 300 indicated by the second field 406. This way, the particular external memory ingress queue 300 and entry 302 from which data is copied is tracked by the memory access control logic 120. The fourth field 410 indicates the amount of data copied to the internal memory 118. In one embodiment, the fourth field 410 indicates whether whole or partial data packets are copied to the internal memory 118. The control logic 120 may maintain one or more additional fields 412 related to data copied to the internal memory 118.

The memory access control logic 120 also maintains two pointers 414, 416 for tracking activity within the internal memory ingress queue 400 and maintaining data coherency. The first pointer 414 identifies the first entry 402 in the ingress queue 400 that contains invalid data when the internal memory 118 is not yet full. Otherwise, the first pointer 414 identifies an entry 402 in the ingress queue 400 that contains valid data. This entry is known to the control logic 120 by examining the first field 404 of the entries 402. This way, data newly copied to the internal memory 118 can be efficiently stored in the next available ingress queue entry 402. The first field 404 of the entry 402 is then changed to indicate that the entry 402 now contains valid data. The first pointer 414 is also moved to identify the next entry 402 available for storing data. The second pointer 416 identifies the first entry 402 in the internal memory ingress queue 400 that contains valid data yet to be retrieved by the processor 102. This entry 402 is accessed the next time the processor 102 retrieves data from the internal memory 118. After data is retrieved from the entry 402, the first field 404 of the entry 402 is changed to indicate that the entry 402 no longer contains valid data. The second pointer 416 is also moved to the next entry 402 in the internal memory ingress queue 400. The memory access control logic 120 maintains data coherency between the external and internal memories 108, 118 by maintaining the ingress queue pointers 312, 314, 414, 416 as described above. This way, the processor 102 can begin to reliably service a peripheral device event by retrieving valid data from the next entry 402 in the internal memory ingress queue 400 yet to be accessed by the processor 102. The second and third fields 406, 408 of this entry 402, respectively, indicate which external memory ingress queue 300 and entry 302 the data was originally copied from. Thus, the processor 102 can readily identify where in external main memory 108 the remainder of the peripheral data is stored and can modify it accordingly.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. An embedded system for a mobile or cell phone, the embedded system arranged as a single semiconductor die, the embedded system comprising:
   an internal memory configured to store data;
   a direct memory access (DMA) controller operable to read data from a peripheral device in response to an event external to the semiconductor die, write the data to memory external to the semiconductor die and write the data or a portion of the data to the internal memory;
   logic operable to track which portion of the data is stored in both the external memory and the internal memory; and a processor configured for executing instructions or software for carrying out operations of the cell or mobile phone, one or more caches associated with the processor, wherein the one or more processor caches are processor caches that are locally accessible by the processor and are logically and physically separated from the internal memory, wherein the internal memory is not a processor cache, wherein the processor is operable to retrieve the data written to the internal memory and use the retrieved data to begin servicing the event.

2. The embedded system of claim 1, wherein the internal memory has a higher access rate than the external memory when the processor accesses the internal memory or external memory respectively.

3. The embedded system of claim 1, wherein the internal memory is a random access memory (RAM).

4. The embedded system of claim 1, wherein the internal memory is selectively accessed by the DMA controller.

5. The embedded system of claim 1, wherein the one or more caches are accessible only by the processor.

6. The embedded system of claim 1, wherein the processor services the event by executing processor instructions or software based on the data stored in the internal memory.

7. The embedded system of claim 6, wherein the data stored includes processor instructions or a processor instruction.

8. The embedded system of claim 6, wherein the data stored includes software that is executable by the processor.

9. The embedded system of claim 1, wherein the DMA controller is configured to accept interrupt signals that signal an existence of the event.

10. The embedded system of claim 1, wherein the peripheral device is an I/O device, wherein the I/O interface is arranged on the semiconductor die.

11. The embedded system of claim 1, wherein the semiconductor die is a system on chip.

12. The embedded system of claim 1, wherein the one or more I/O devices are configured for a peripheral device selected from the group consisting of an Ethernet device, a USB device, and a UART device.

13. The embedded system of claim 1, wherein the internal memory is a dynamic random access memory (DRAM).

14. The embedded system of claim 1, wherein the caches are high speed caches.

15. The embedded system of claim 1, wherein the internal memory is limited in storage space with respect to the external memory.

16. The embedded system of claim 1, wherein the event indicates that new data is available.

17. The embedded system of claim 16, wherein the new data is generated from the peripheral device.

18. The embedded system of claim 16, wherein the event indicates a token packet is received by the peripheral device.

19. The embedded system of claim 1, further comprising an arbiter that requests access to the external memory.

20. The embedded system of claim 19, wherein the arbiter is integrated with the DMA controller.

21. The embedded system of claim 1, wherein the DMA controller requests access to the external memory.

22. The embedded system of claim 21, wherein the DMA controller is controlled in part by the processor to make requests to access external memory.

23. The embedded system of claim 1, wherein the DMA controller manages flow of data between the peripheral and the external memory.

24. The embedded system of claim 1, wherein the DMA controller accesses the external memory to arrange to obtain data previously stored in the external memory and operates to copy the data from the external memory into the internal memory.

25. The embedded system of claim 1, wherein the DMA controller operates to store the data in the external memory and internal memory in parallel.

26. The embedded system of claim 1, wherein the logic is operable to track different peripheral devices by accessing different queues allocated to each peripheral device.

27. The embedded system of claim 23, wherein traffic from a same peripheral device is prioritized.

28. The embedded system of claim 1, further comprising a scheduler that determines the order in which data is copied from external memory to the internal memory.

29. The embedded system of claim 1, wherein the logic is operable to:

update a multi-entry external memory ingress queue allocated to the peripheral device responsive to the data being written to the external memory and the data or a portion of the data being written to the internal memory.

30. The embedded system of claim 29, wherein the logic is operable to:

update a multi-entry internal memory ingress queue responsive to the data or a portion of the data being written to the internal memory.

31. The embedded system of claim 30, wherein the multi-entry internal memory ingress queue is arranged on the semiconductor die.

32. The embedded system of claim 29, wherein the logic is operable to at least one of:

identify the entry of the multi-entry external memory ingress queue that contains invalid data;

identify the entry of the multi-entry external memory ingress queue that contains valid data yet to be written to the internal memory; and update the entry of the multi-entry external memory ingress queue in which at least a portion of the data read from the peripheral device is stored.

33. The embedded system of claim 29, wherein the logic is operable to at least one of:

indicate whether the entry contains valid data and the size of the valid data;

indicate an address of the external memory where a beginning portion of the data is stored;

indicate whether the entry contains data written to the internal memory; and indicate whether the entry contains invalid data after the processor completes servicing of the event.

34. The embedded system of claim 30, wherein the logic is operable to at least one of:

identify the entry of the internal memory ingress queue that contains invalid data;

identify the entry of the internal memory ingress queue that contains valid data yet to be read by the processor; and update the entry of the internal memory ingress queue in which at least a portion of the written data is stored.

35. The embedded system of claim 30, wherein the logic is operable to at least one of:

indicate whether the entry contains valid data;

indicate which entry of the multi-entry external memory ingress queue contains data corresponding to the data written to the internal memory; and indicate whether the entry contains invalid data after the processor completes servicing of the event.

36. The embedded system of claim 1, wherein the direct memory access controller is operable to write a quantity of the data to the internal memory corresponding to a configuration parameter provided to the system.

37. The embedded system of claim 1, wherein the configuration parameter indicates the quantity of data to be written to the internal memory.

38. The embedded system of claim 1, wherein the processor is operable to continue servicing the event based on a remainder of the data retrieved from the external memory.

39. The embedded system of claim 1, wherein the processor is operable to load the data retrieved from the internal memory into at least one cache of the processor.

40. The embedded system of claim 1, wherein the processor is operable to load the data retrieved from the internal memory into at least one cache of the processor directly from the internal memory.

* * * * *